US012766670B2

(12) United States Patent
Chang

(10) Patent No.: US 12,766,670 B2
(45) Date of Patent: Oct. 20, 2026

(54) CLAMPER ACTUATION MECHANISM AND CLAMPING FIXER APPLIED IN THE SAME

(71) Applicant: Woodfox tools Co., Ltd, Taichung City (TW)

(72) Inventor: Chao-Chuan Chang, Taichung City (TW)

(73) Assignee: Woodfox tools Co. , Ltd, Taichung City (TW)

( * ) Notice: Subject to any disclaimer, the term of this patent is extended or adjusted under 35 U.S.C. 154(b) by 294 days.

(21) Appl. No.: 18/777,329

(22) Filed: Jul. 18, 2024

(65) Prior Publication Data

US 2025/0033167 A1 Jan. 30, 2025

(30) Foreign Application Priority Data

Jul. 25, 2023 (TW) ................................ 112207821

(51) Int. Cl.
*B25B 5/14* (2006.01)
*B25B 5/02* (2006.01)

(52) U.S. Cl.
CPC ................ *B25B 5/145* (2013.01); *B25B 5/02* (2013.01)

(58) Field of Classification Search
CPC .. B25B 5/00; B25B 5/145; B25B 5/02; B25B 5/127; B25B 5/068; B25B 27/205; B25B 9/04
See application file for complete search history.

(56) References Cited

U.S. PATENT DOCUMENTS

| | | | | |
|---|---|---|---|---|
| 2018/0015599 | A1* | 1/2018 | Chen | B25B 27/30 |
| 2018/0326559 | A1* | 11/2018 | Lai | B25B 5/068 |
| 2022/0072687 | A1* | 3/2022 | Friis | B25B 5/02 |

* cited by examiner

*Primary Examiner* — Sunil K Singh
*Assistant Examiner* — Amanda Kreiling

(57) ABSTRACT

A clamper actuation mechanism contains: a fixed clamper, a drive handle, and a movable clamper. The fixed clamper includes a fixed defining sheet, two first pieces, two elongated slots, two first locating orifices, and two second locating orifices. The drive handle includes a press extension, a third locating orifice, a fourth locating orifice, and a first stem. The movable clamper includes a movable defining sheet and two second pieces. Two fifth locating orifices are formed on the two first pieces, two limiting grooves are defined on the movable clamper, and a second stem is inserted through the two fifth locating orifices and the two elongated slots to rotatably connect the movable clamper and the fixed clamper. A control bar is inserted through the two limiting grooves, the two second locating orifices and the fourth locating orifice to rotatably connect the movable clamper, the drive handle, and the fixed clamper.

7 Claims, 9 Drawing Sheets

CLAMPER ACTUATION MECHANISM AND CLAMPING FIXER APPLIED IN THE SAME

TECHNICAL FIELD

The present invention relates to a clamper actuation mechanism, and more particularly to a clamping fixer applied in the clamper actuation mechanism.

BACKGROUND

When desiring to clamp and fix plate-like materials such as wooden boards and outdoor floors with screws, conventional clampers cannot match the position of the plate-like materials and lock the screws, so hand-held clamps are often used for clamping. When the clamping tool is configured to clamp an object, it drives the clamping piece to move through the actuation mechanism to clamp the object.

A plate clamping and fixing tool is shown in FIG. 10. It is an installation tool 1 disclosed in European Patent No. EP2517834. The installation tool 1 includes a hollow frame 11 and two holes located on both sides of the frame 11. The positioning mechanism 12 on the opposite side, a handle 13 connected to the frame 11, and a driving mechanism 14 for driving the positioning mechanism 12 on the left side in FIG. 2. Each positioning mechanism 12 includes a positioning block 121 whose position can be adjusted along the length direction of the frame 11, and a positioning claw 123 connected to the positioning block 121 and protruding from the frame 11 to clamp and position an object A. And a guide channel 124 is inclined through the positioning block 121 and the positioning clamp 123. The positioning block 121 forms a chip discharge port 122 connected to the guide channel 124. The driving mechanism 14 includes a spring 141 and a driving handle 142 pivoted on the frame 11. One end of the spring 141 is hooked on the frame 11, and the other end can move with the positioning mechanism 12 on the left side in FIG. 2. In application, the user can pull the driving handle 142 in the direction shown by arrow 15 in FIG. 2 to drive the positioning block 121 on the left side in FIG. 2 to move in the direction shown by arrow 16 in FIG. 2, and then use the matching The object A is clamped and positioned by the positioning claw 123 and the elastic restoring force of the spring 141, and then the two fasteners B can be tilted and locked in the object A along the guide channel 124.

When the conventional method is used to clamp an object, elastic force is used to clamp the object. Therefore, before the positioning jaws 123 clamp the object, the user must continue to apply force on the driving handle 142 to allow the positioning jaws 123 on both sides to move. The distance between them is larger than the objects, making it inconvenient to operate. Furthermore, the conventional method only uses the elastic force of the spring 141 for clamping, and the stability of the clamping is poor. If a large force is applied during the locking process or the installation tool 1 is slightly impacted, the installation tool 1 may easily detach from the object.

The present invention has arisen to mitigate and/or obviate the afore-described disadvantages.

SUMMARY

The primary aspect of the present invention is to provide a clamper actuation mechanism and a clamping fixer applied in the same which is capable of working or locking the wooden boards easily.

To obtain above-mentioned aspect, a clamper actuation mechanism provided by the present invention contains: a fixed clamper, a drive handle, and a movable clamper.

The fixed clamper includes a fixed defining sheet fixed on a bottom of an end thereof, two first pieces oppositely connected on the other end of the fixed clamper, two elongated slots defined on the two first pieces, two first locating orifices formed adjacent to the two elongated slots, and two second locating orifices formed proximate to the two first locating orifices and extending horizontally.

The drive handle including a press extension formed on a top thereof, a third locating orifice defined on a bottom end of the drive handle, a fourth locating orifice defined adjacent to the third locating orifice, and a first stem passing through the two first locating orifices and the third locating orifice to rotatably connect the drive handle and the fixed clamper.

The movable clamper includes a movable defining sheet fixed on a bottom of an end thereof, and two second pieces oppositely connected on the other end of the movable clamper, a distance between two inner walls of the two second pieces is greater than a distance between two outer walls of the two first pieces so that the two second pieces are slidably fitted on the two outer walls of the two first pieces, two fifth locating orifices are formed proximate to two predetermined positions of two first ends of the two first pieces, two limiting grooves are defined on a predetermined positions of a middle section of the movable clamper, a second stem is inserted through the two fifth locating orifices and the two elongated slots so that the movable clamper and the fixed clamper are rotatably connected, and a control bar is inserted through the two limiting grooves, the two second locating orifices and the fourth locating orifice to rotatably connect the movable clamper, the drive handle, and the fixed clamper.

A respective one limiting groove has multiple positioning portions formed thereon, an engaging portion formed on the control bar;

When removing the engaging portion from the multiple positioning portions, the movable clamper is slidably moved along the two elongated slots to adjust the distance between the fixed clamper and the movable clamper.

When the engaging portion is engaged in the multiple positioning portions, the movable clamper is not slidably moved so that the press extension of the drive handle is manually pressed, the drive handle is titled along the first stem to actuate the movable clamper to move along the two second locating orifices, thus clamping the workpiece.

DETAILED DESCRIPTION

Figure 1:
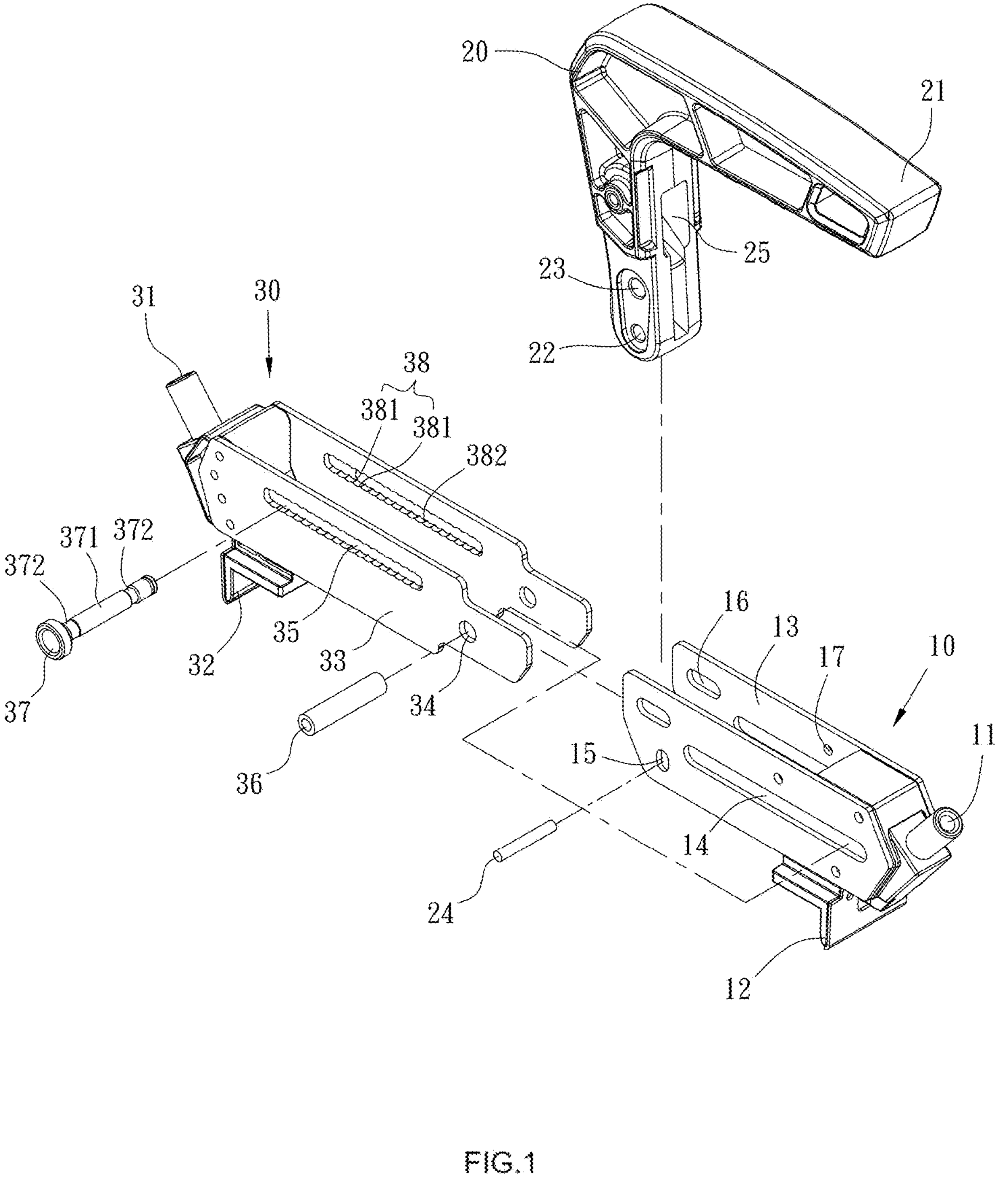
FIG. 1 is a perspective view showing the exploded components of a clamper actuation mechanism according to a preferred embodiment of the present invention.

With reference to FIGS. 1-9, a clamper actuation mechanism and a clamping fixer applied in the same according to a preferred embodiment of the present invention, the clamper actuation mechanism 1 comprises: a fixed clamper 10, a drive handle 20, and a movable clamper 30, wherein the clamper actuation mechanism 1 mates with a retainer 40 and two peripheral plates 50 to form the clamping fixer 2.

The fixed clamper 10 is in a horizontal U shape, and the fixed clamper 10 includes a hollow cylinder 11 formed on an end thereof and configured to accommodate multiple screws, a fixed defining sheet 12 fixed on a bottom of the hollow cylinder 11, two first pieces 13 oppositely connected on the other end of the fixed clamper 10, two elongated slots 14 defined on the two first pieces 13, two first locating orifices 15 formed adjacent to the two elongated slots 14, two second locating orifices 16 formed proximate to the two first locating orifices 15, two sixth locating orifices 17 adjacent to two tops of the two elongated slots 14, wherein the two first locating orifices 15 are oval and extend vertically, and the two second locating orifices 16 horizontally extend.

The drive handle 20 is in an inverted L shape, and the drive handle 20 includes a press extension 21 formed on a top thereof, a third locating orifice 22 defined on a bottom end of the drive handle 20, a fourth locating orifice 23 defined adjacent to the third locating orifice 22, a first stem 24 passing through the two first locating orifices 15 and the third locating orifice 22 to rotatably connect the drive handle 20 and the fixed clamper 10. The drive handle 20 further includes a receiving groove 25 defined on a middle section of a side thereof, a seventh locating orifice 26 formed on the other side of the drive handle 20, vertically communicating with the receiving groove 25, and configured to rotatably connected with the retainer 40.

The movable clamper 30 is in a horizontal U-shape and includes a hollow cylinder 31 formed on an end thereof and configured to accommodate the multiple screws, a movable defining sheet 32 fixed on a bottom of the hollow cylinder 31, two second pieces 33 oppositely connected on the other end of the movable clamper 30, wherein a distance between two inner walls of the two second pieces 33 is greater than a distance between two outer walls of the two first pieces 13 so that the two second pieces 33 are slidably fitted on the two outer walls of the two first pieces 13, two fifth locating orifices 34 formed proximate to two predetermined positions of two first ends of the two first pieces 13, two limiting grooves 35 defined on a predetermined positions of a middle section of the movable clamper 30, a second stem 36 inserted through the two fifth locating orifices 34 and the two elongated slots 14 so that the movable clamper 30 and the fixed clamper 10 are rotatably connected, a control bar 37 inserted through the two limiting grooves 35, the two second locating orifices 16 and the fourth locating orifice 23 to rotatably connect the movable clamper 30, the drive handle 20, and the fixed clamper 10.

A respective one limiting groove 35 has multiple positioning portions 38 formed thereon, an engaging portion 371 formed on the control bar 37 and two recesses 372 defined on the control bar 37. A respective one positioning portion 38 has multiple circular teeth 381 surrounding the respective one limiting groove 35, wherein a toothed corner 382 is defined between any two connected circular teeth 381, and a diameter of the toothed corner 382 is less than a diameter of the respective one positioning portion 38. The engaging portion 371 of the control bar 37 is a circular column and is fitted on two vertically opposite circular teeth 381 and is limited by any two adjacent toothed corner 382, the two recesses 372 are formed on two ends of the engaging portion 371, wherein a diameter of a respective one recess 372 is less than a distance between two vertically opposite toothed corners 382 of the respective one positioning portion 38.

The retainer 40 is connected between the fixed clamper 10 and the drive handle 20, and the retainer 40 includes a locking holder 41, an actuation shaft 42, a locking sheet 43, an operation sheet 44, and at least one resilient element 45. The locking holder 41 includes an eighth locating orifice 411 formed on an end thereof, a third stem 46 is rotatably connected in the two sixth locating orifices 17 of the two first pieces 13, and two partition sheets 412 extending from two sides of a top of the locking holder 41 to space an accommodation space, wherein one partition sheet 412 has a cutout 413 communicating with the accommodation space of the two partition sheets 412, such that after the actuation shaft 42 is inserted into the accommodation space, a fourth stem 47 is rotatably connected in the cutout 413 via a first coupling orifice 421 of the actuation shaft 42 so that the actuation shaft 42 is limited by the cutout 413 when operating. The two partition sheets 412 have two ninth locating orifices 414 defined on two tops thereof and configured to accommodate s fifth stem 48, and a bottom of the operation sheet 44 is rotatably connected on a top of the locking holder 41, wherein the operation sheet 44 has a driving portion 441 extending from a top of an end thereof, an abutting portion 442 formed on the other end of the operation sheet 44 to drive the locking sheet 43, and a tenth locating orifice 443 defined on a bottom of the operation sheet 44 to rotatably connected with the fifth stem 48.

The locking sheet 43 is in an inverted L shape and has a through orifice 431 formed on a bottom thereof and configured to receive an end of the actuation shaft 42, wherein a top of the locking sheet 43 abuts against the abutting portion 442, and when the driving portion 441 is pulled upward, the abutting portion 442 forces the locking holder 43. The other end of the actuation shaft 42 is received in the receiving groove 25 of the drive handle 20, a sixth stem 49 is inserted through a second coupling orifice 422 of the actuation shaft 42 to rotatably connect with the seventh locating orifice 26, and the at least one resilient element 45 is fitted on the actuation shaft 42 and defined between the locking sheet 43 and the receiving groove 25 to drive the drive handle 20 to move back to an original position.

A size of the two peripheral plates 50 is greater than a size of the two second pieces 33, and the two peripheral plates 50 are locked on two outer sides of the two second pieces 33, wherein the two peripheral plates 50 include two elongated holes 51 corresponding to the two limiting grooves 35, and one elongated hole 51 has a scale section 52 formed below a bottom thereof.

Figure 2:
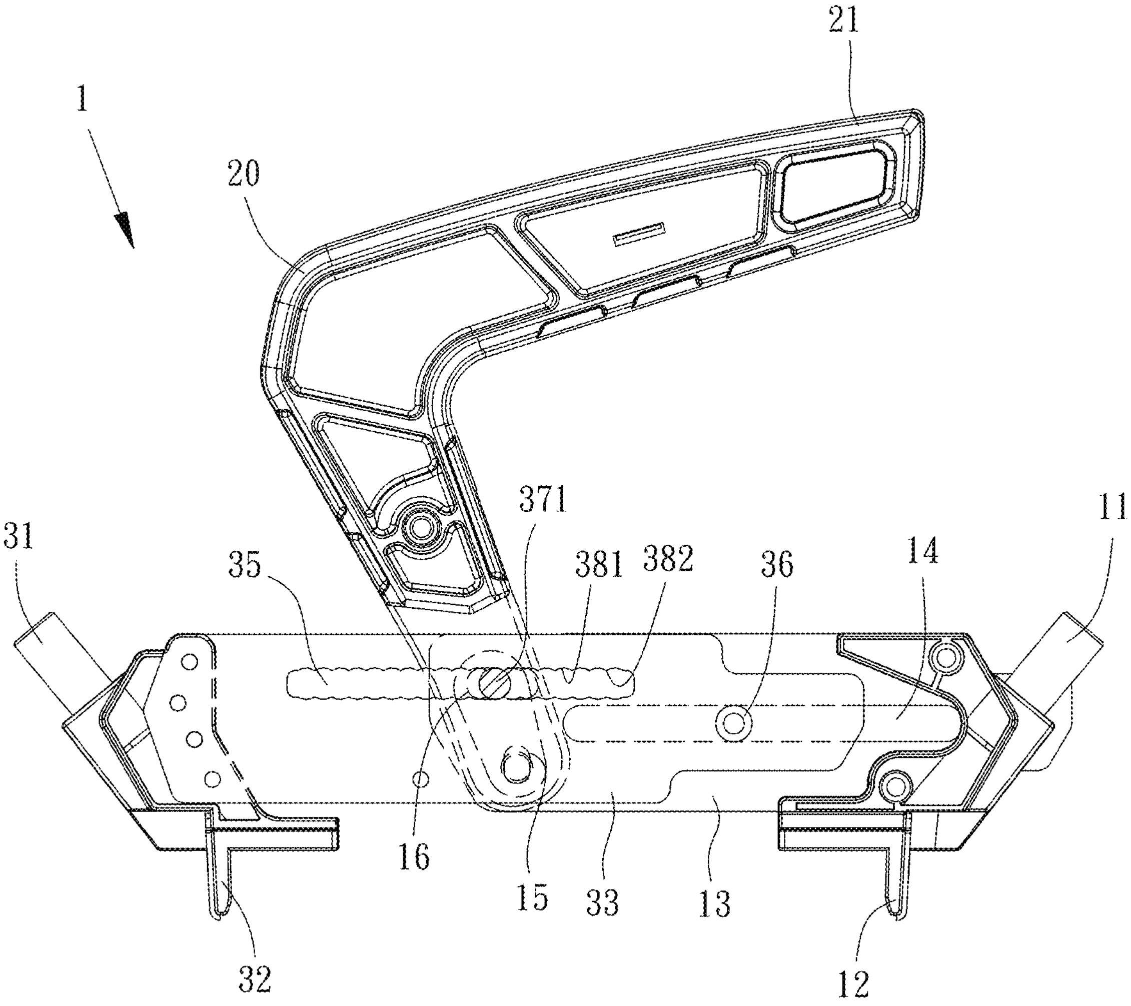
FIG. 2 is a side plan view showing the operation of the clamper actuation mechanism according to the preferred embodiment of the present invention.
Figure 3:
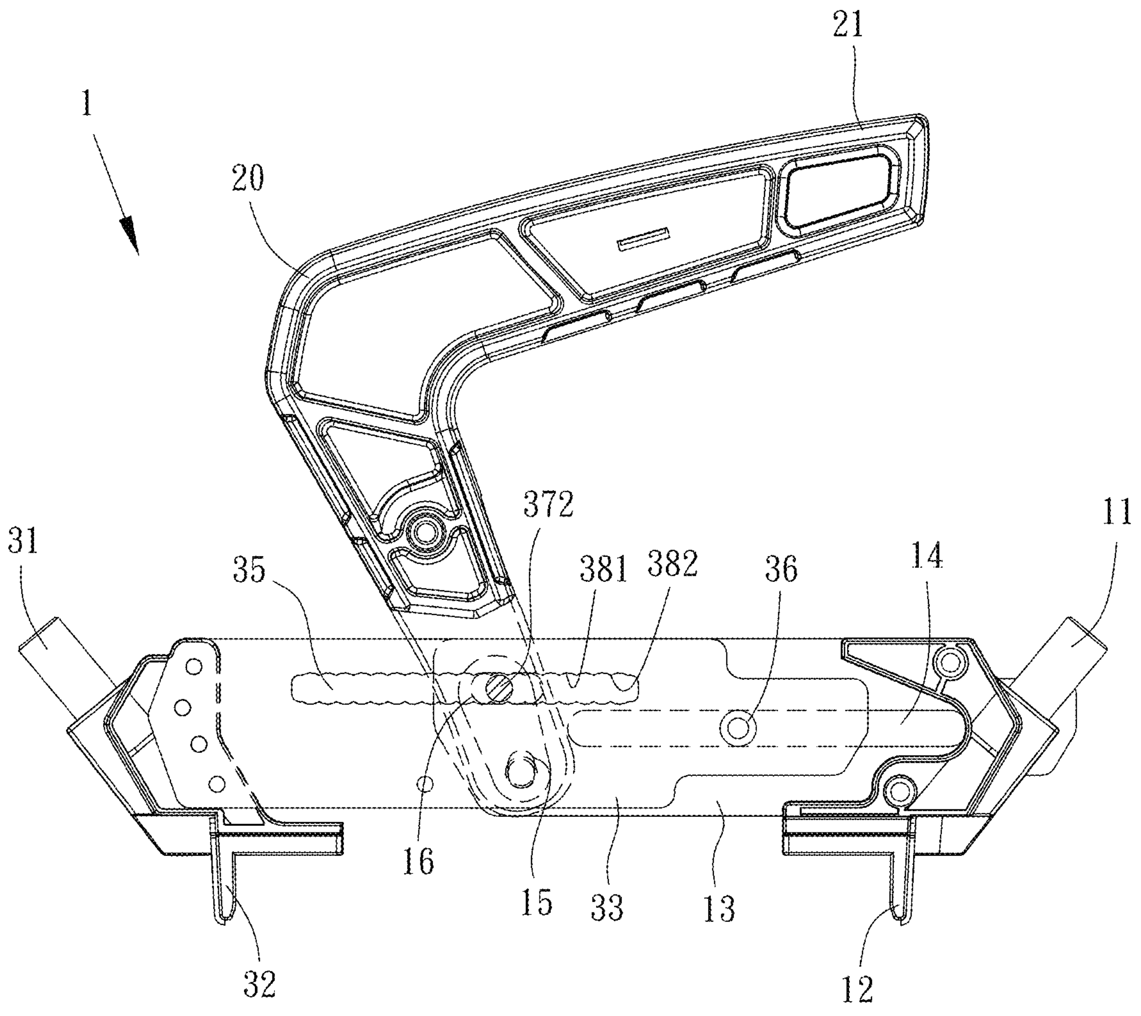
FIG. 3 is another side plan view showing the operation of the clamper actuation mechanism according to the preferred embodiment of the present invention.
Figure 4:
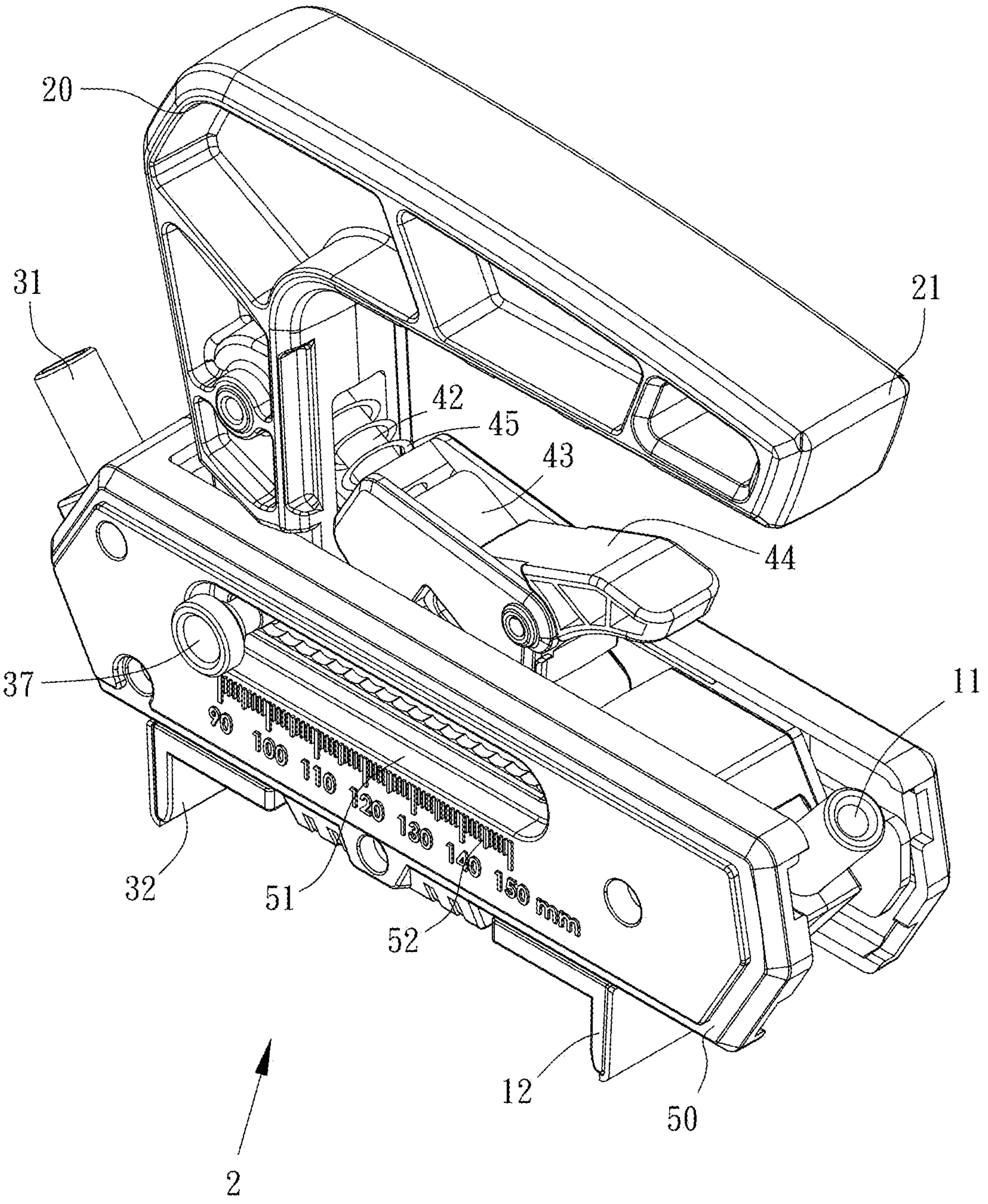
FIG. 4 is a perspective view showing the assembly of a clamping fixer according to the preferred embodiment of the present invention.
Figure 5:
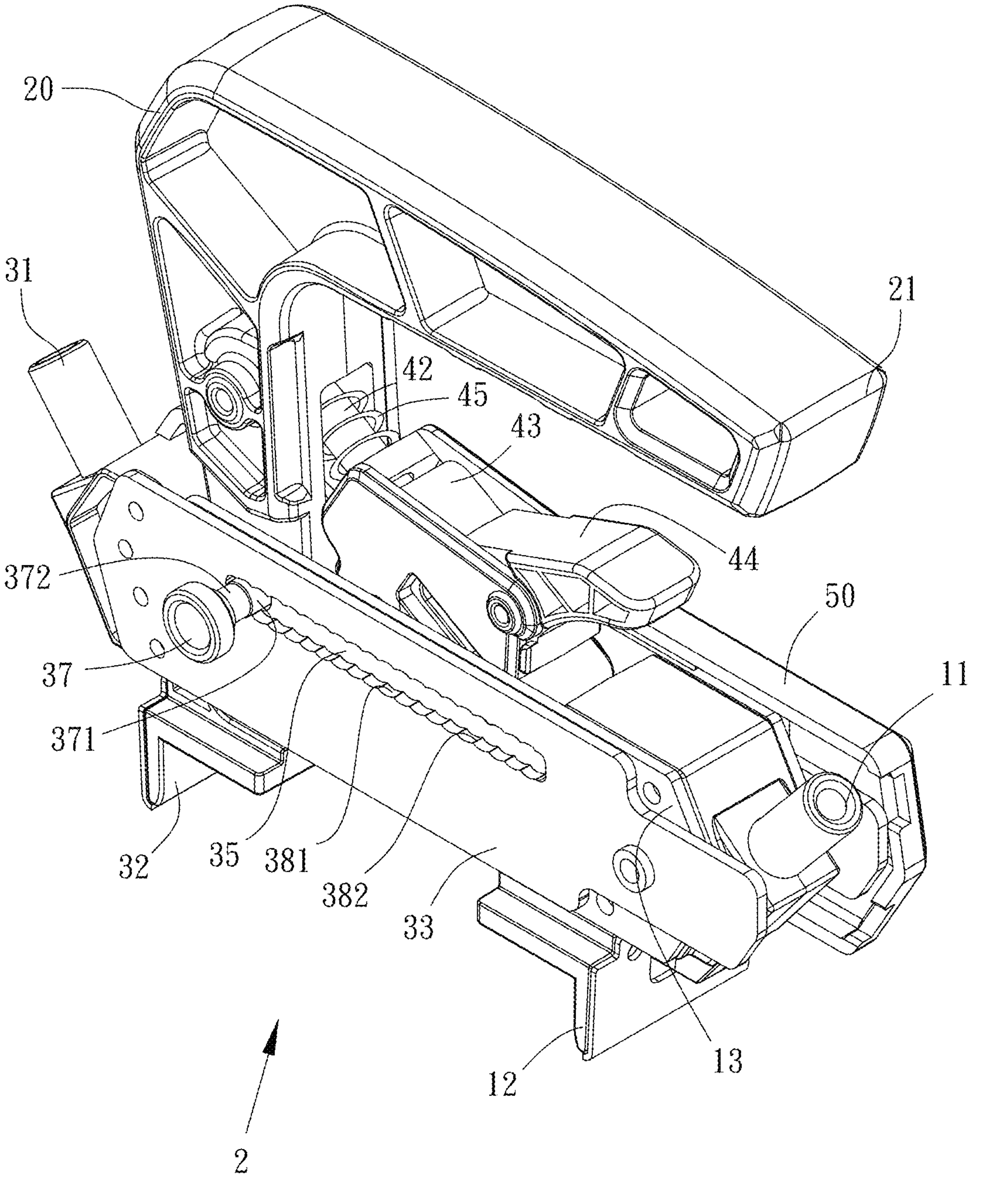
FIG. 5 is another perspective view showing the assembly of the clamping fixer according to the preferred embodiment of the present invention.
Figure 6:
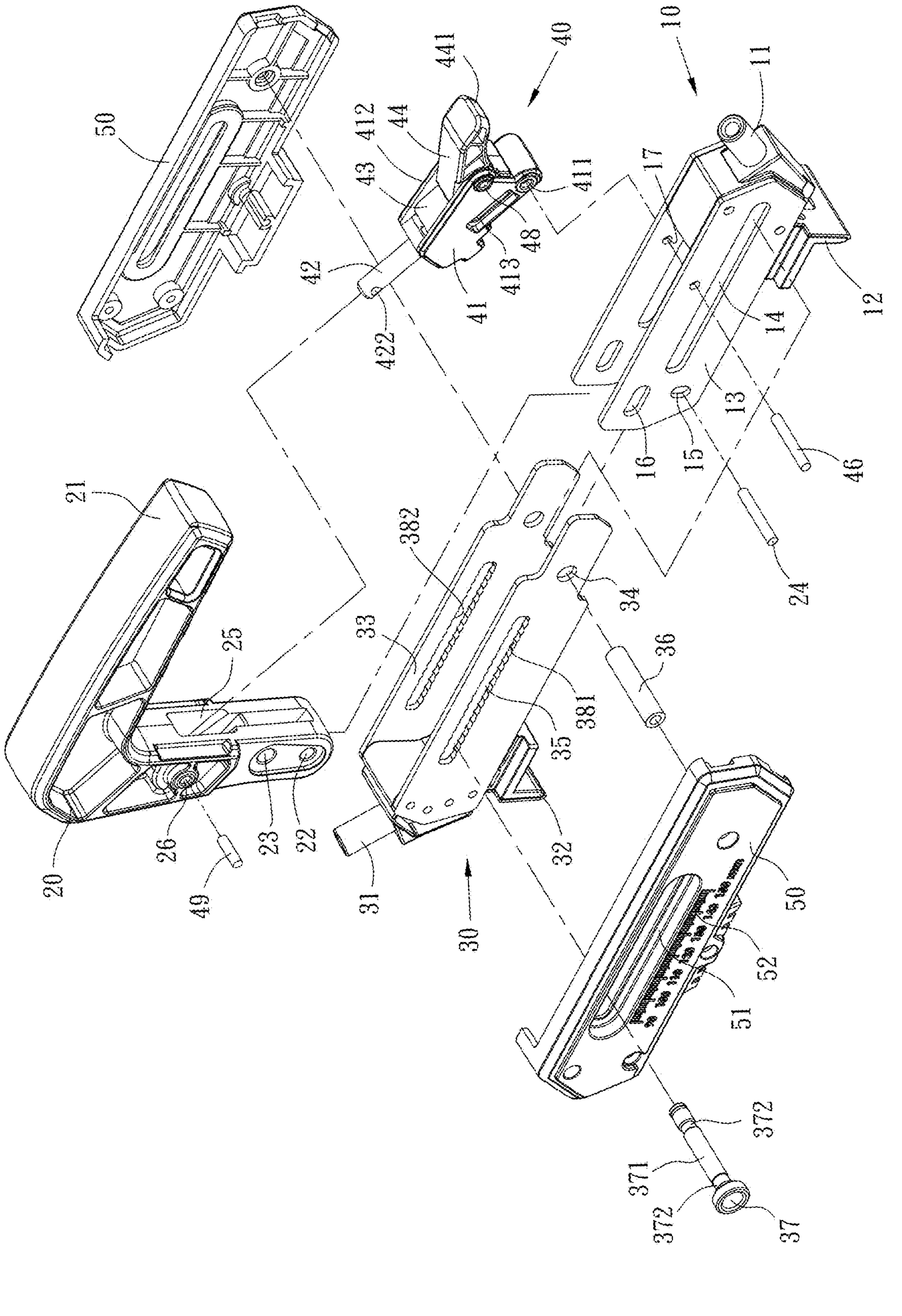
FIG. 6 is a perspective view showing the exploded components of the clamping fixer according to the preferred embodiment of the present invention.
Figure 7:
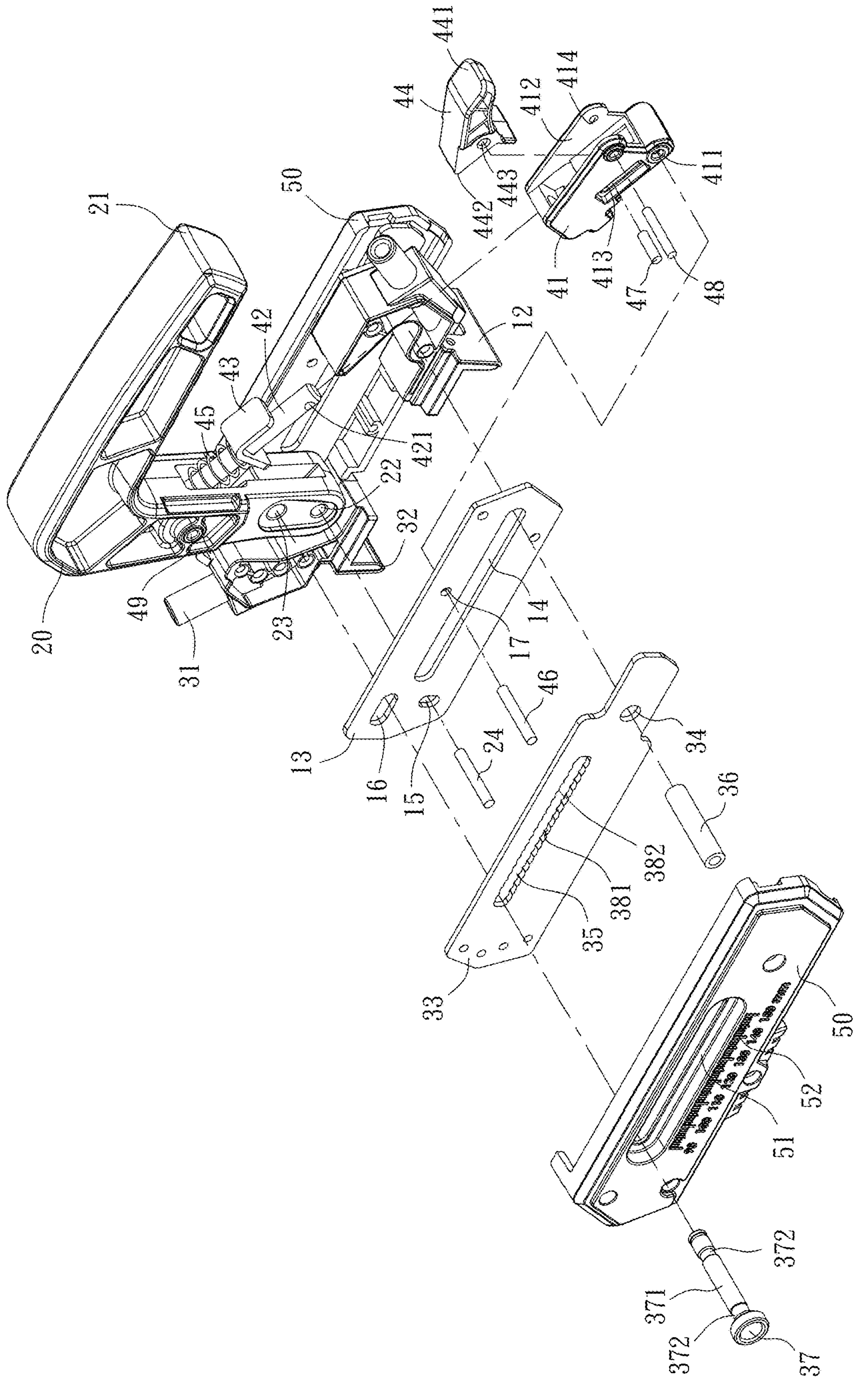
FIG. 7 is another perspective view showing the exploded components of the clamping fixer according to the preferred embodiment of the present invention.

When a user is desired to clamp a workpiece, such as a wooden board, the control bar 37 is pushed so that the two recesses 372 of the control bar 37 are located in the multiple positioning portions 38, as shown in FIG. 3, hence the control bar 37 is removal so that the movable clamper 30 is slidably moved to adjust the distance between the fixed clamper 12 and the movable clamper 32, then the control bar 37 is moved so that engaging portion 371 is located in the multiple positioning portions 38, as shown in FIGS. 2 and 4-5, thus engaging the control bar 37 securely.

Figure 8:
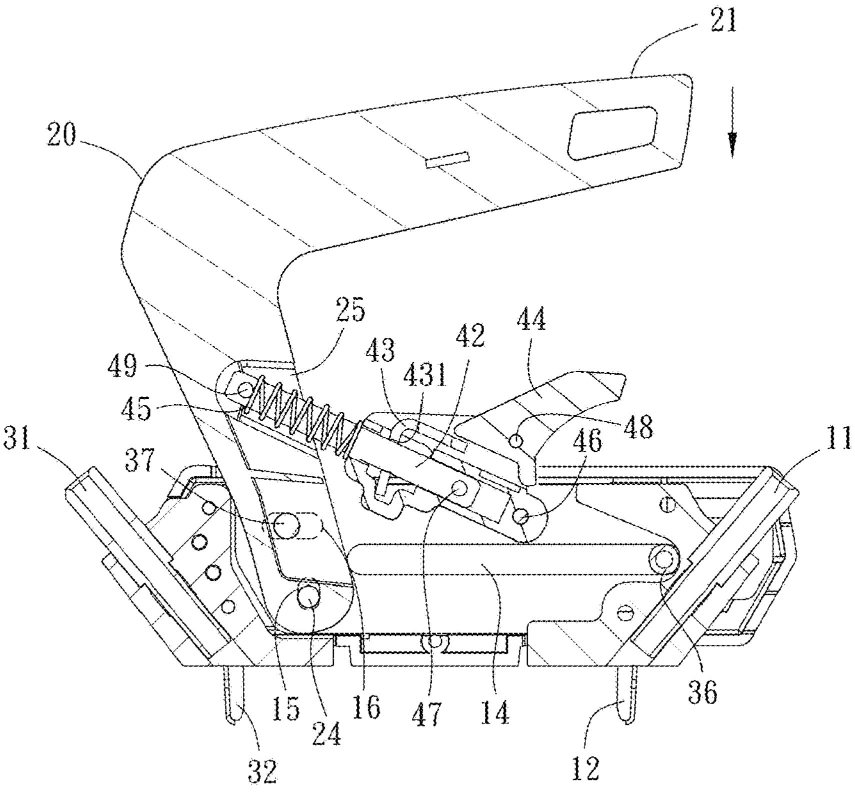
FIG. 8 is a cross sectional view showing the assembly of a clamping fixer according to the preferred embodiment of the present invention.
Figure 9:
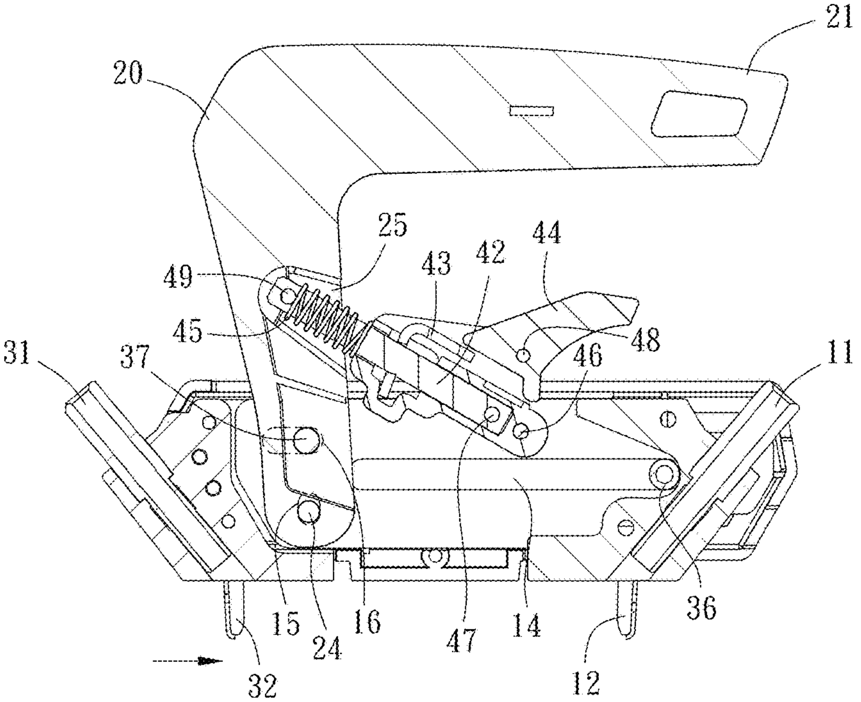
FIG. 9 is another cross sectional view showing the assembly of the clamping fixer according to the preferred embodiment of the present invention.
Figure 10:
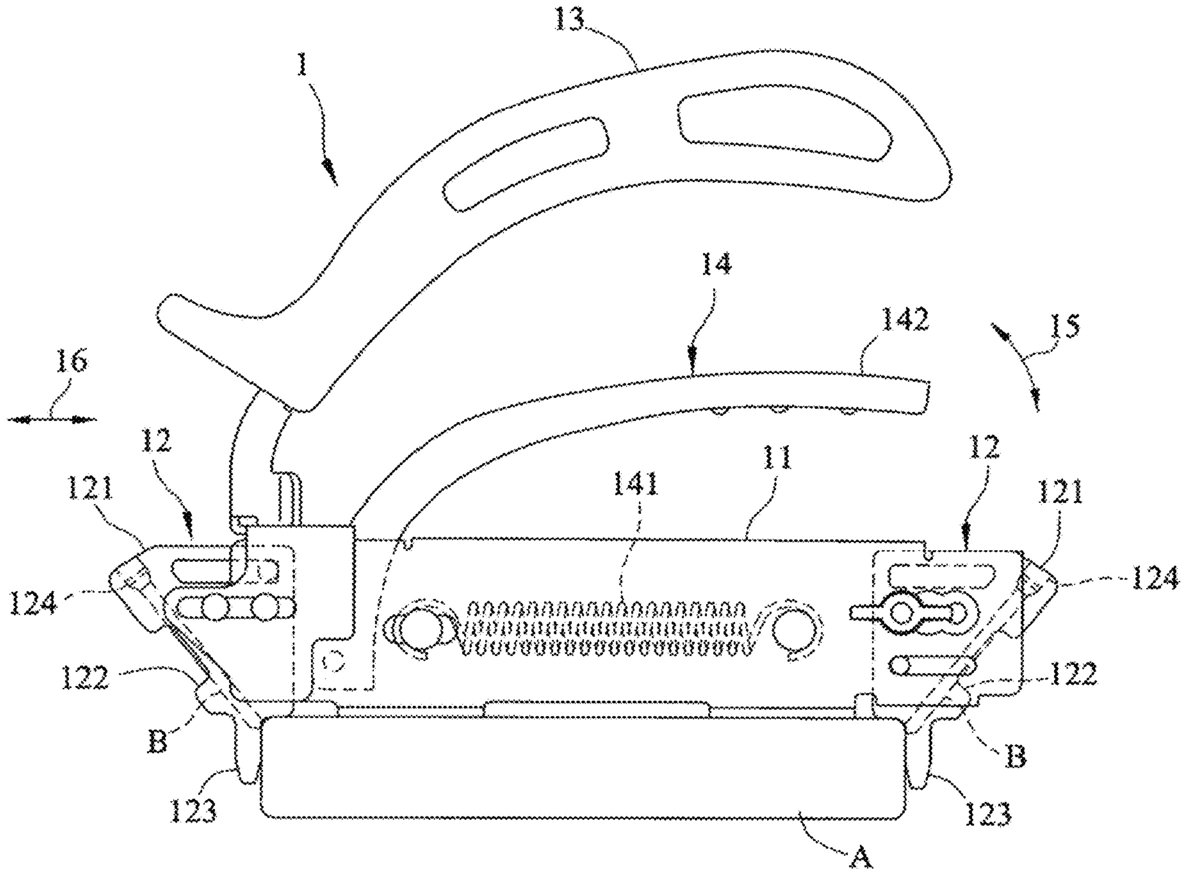
FIG. 10 is a schematics view of a conventional clamping fixer.

Referring to FIGS. 8 and 9, after a clamping size is adjusted by using the scale section 52, the distance between the fixed defining sheet 12 and the movable defining sheet 32 is greater than the clamping size of the scale section 52. After the press extension 21 of the drive handle 20 is manually pressed by the user, the drive handle 20 is titled along the first stem 24 to actuate the movable clamper 30 to move along the two second locating orifices 16, thus clamping the workpiece. After clamping the workpiece by using the fixed clamper 12 and the movable clamper 32, the locking sheet 43 is forced by the at least one resilient element 45 to obliquely engage with the actuation shaft 42, and the abutting portion 442 limits a tilted angle of the locking sheet 43, hence a tilted angle of the drive handle 20 is fixed so that the workpiece is clamped by the fixed clamper 12 and the movable clamper 32 stably, thus working or locking the workpiece. When desiring to remove the clamping fixer 2, the driving portion 441 is pulled upward to drive the abutting portion 442 to rotate downward, and the locking sheet 43 is forced by the abutting portion 442 to remove from the actuation shaft 42, then the actuation shaft 42 is pushed by the at least one resilient element 45 to move back to the original position.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A clamper actuation mechanism comprising: a fixed clamper, a drive handle, and a movable clamper;

wherein the fixed clamper includes a fixed defining sheet fixed on a bottom of an end thereof, two first pieces oppositely connected on the other end of the fixed clamper, two elongated slots defined on the two first pieces, two first locating orifices formed adjacent to the two elongated slots, and two second locating orifices formed proximate to the two first locating orifices and extending horizontally;

wherein the drive handle including a press extension formed on a top thereof, a third locating orifice defined on a bottom end of the drive handle, a fourth locating orifice defined adjacent to the third locating orifice, and a first stem passing through the two first locating orifices and the third locating orifice to rotatably connect the drive handle and the fixed clamper;

wherein the movable clamper includes a movable defining sheet fixed on a bottom of an end thereof, and two second pieces oppositely connected on the other end of the movable clamper, wherein a distance between two inner walls of the two second pieces is greater than a distance between two outer walls of the two first pieces so that the two second pieces are slidably fitted on the two outer walls of the two first pieces, two fifth locating orifices are formed proximate to two predetermined positions of two first ends of the two first pieces, two limiting grooves are defined on a predetermined positions of a middle section of the movable clamper, a second stem is inserted through the two fifth locating orifices and the two elongated slots so that the movable clamper and the fixed clamper are rotatably connected, and a control bar is inserted through the two limiting grooves, the two second locating orifices and the fourth locating orifice to rotatably connect the movable clamper, the drive handle, and the fixed clamper;

wherein a respective one limiting groove has multiple positioning portions formed thereon, an engaging portion formed on the control bar;

wherein when removing the engaging portion from the multiple positioning portions, the movable clamper is slidably moved along the two elongated slots to adjust the distance between the fixed clamper and the movable clamper; and when the engaging portion is engaged in the multiple positioning portions, the movable clamper is not slidably moved so that the press extension of the drive handle is manually pressed, the drive handle is titled along the first stem to actuate the movable clamper to move along the two second locating orifices, thus clamping the workpiece.

2. The clamper actuation mechanism as claimed in claim 1, wherein the two first locating orifices are oval and extend vertically so that when the drive handle is pressed to tilt, the first stem is not engaged.

3. The clamper actuation mechanism as claimed in claim 1, wherein a respective one positioning portion has multiple circular teeth surrounding the respective one limiting groove, wherein a toothed corner is defined between any two connected circular teeth, and a diameter of the toothed corner is less than a diameter of the respective one positioning portion; the engaging portion of the control bar is a circular column and is fitted on two vertically opposite circular teeth and is limited by any two adjacent toothed corner, the two recesses are formed on two ends of the engaging portion, wherein a diameter of a respective one recess is less than a distance between two vertically opposite toothed corners of the respective one positioning portion.

4. A clamping fixer comprising a clamper actuation mechanism of claim 1, a retainer, and two peripheral plates, wherein the retainer is defined between the fixed clamper and the drive handle, and the retainer includes a locking sheet; the two peripheral plates are locked on two outer sides of the two second pieces, wherein the two peripheral plates include two elongated holes corresponding to the two limiting grooves.

5. The clamping fixer as claimed in claim 4, wherein two sixth locating orifices are adjacent to two tops of the two elongated slots; the drive handle further includes a receiving groove defined on a middle section of a side thereof, a seventh locating orifice formed on the other side of the drive handle, vertically communicating with the receiving groove, and configured to rotatably connected with the retainer;

wherein the locking holder includes an eighth locating orifice formed on an end thereof, a third stem is rotatably connected in the two sixth locating orifices of the two first pieces, and two partition sheets extending from two sides of a top of the locking holder to space an accommodation space, wherein one partition sheet has a cutout communicating with the accommodation space of the two partition sheets, such that after the actuation shaft is inserted into the accommodation space, a fourth stem is rotatably connected in the cutout via a first coupling orifice of the actuation shaft so that the actuation shaft is limited by the cutout when operating; the two partition sheets have two ninth locating orifices defined on two tops thereof and configured to accommodate s fifth stem, and a bottom of the operation sheet is rotatably connected on a top of the locking holder, wherein the operation sheet has a driving portion extending from a top of an end thereof, an abutting portion formed on the other end of the operation sheet to drive the locking sheet, and a tenth locating orifice defined on a bottom of the operation sheet to rotatably connected with the fifth stem;

wherein the locking sheet is in an inverted L shape and has a through orifice formed on a bottom thereof and configured to receive an end of the actuation shaft, wherein a top of the locking sheet abuts against the abutting portion, and when the driving portion is pulled upward, the abutting portion forces the locking holder, the other end of the actuation shaft is received in the receiving groove of the drive handle, a sixth stem is inserted through a second coupling orifice of the actuation shaft to rotatably connect with the seventh locating orifice, and the at least one resilient element is fitted on the actuation shaft and defined between the locking sheet and the receiving groove to drive the drive handle to move back to an original position.

6. The clamping fixer as claimed in claim 4, wherein one elongated hole has a scale section formed below a bottom thereof.

7. The clamping fixer as claimed in claim 4, wherein the fixed clamper includes a hollow cylinder formed on an end thereof and configured to accommodate multiple screws, and the movable clamper includes a hollow cylinder formed on an end thereof and configured to accommodate the multiple screws.

* * * * *